United States Patent
Sawahashi et al.

[11] Patent Number: 6,069,912
[45] Date of Patent: May 30, 2000

[54] DIVERSITY RECEIVER AND ITS CONTROL METHOD

[75] Inventors: Mamoru Sawahashi; Hidehiro Ando, both of Yokohama; Yoshinori Miki; Kenichi Higuchi, both of Yokosuka; Shinya Tanaka, Yokohama, all of Japan

[73] Assignee: NTT Mobile Communications Network, Inc.

[21] Appl. No.: 08/875,465

[22] PCT Filed: Nov. 28, 1996

[86] PCT No.: PCT/JP96/03485

§ 371 Date: Jul. 28, 1997

§ 102(e) Date: Jul. 28, 1997

[87] PCT Pub. No.: WO97/20400

PCT Pub. Date: Jun. 5, 1997

[30] Foreign Application Priority Data

Nov. 29, 1995 [JP] Japan .................................... 7-311102

[51] Int. Cl.[7] .................................................. H04L 27/30
[52] U.S. Cl. .......................... 375/142; 375/347; 375/140
[58] Field of Search .................................... 375/206, 207, 375/208, 209, 210, 316, 347; 370/320, 335, 342, 441; 455/137, 132, 504, 502, 272, 273

[56] References Cited

U.S. PATENT DOCUMENTS

| | | | |
|---|---|---|---|
| 5,524,023 | 6/1996 | Tsujimoto | 375/232 |
| 5,598,428 | 1/1997 | Sato | 375/206 |
| 5,646,964 | 7/1997 | Ushirokawa et al. | 375/232 |
| 5,652,765 | 7/1997 | Adachi et al. | 375/208 |
| 5,757,845 | 5/1998 | Fukawa et al. | 375/207 |

FOREIGN PATENT DOCUMENTS

7-7170243 4/1995 Japan .

*Primary Examiner*—Chi H. Pham
*Assistant Examiner*—Emmanuel Bayard
*Attorney, Agent, or Firm*—Brown Raysman Millstein Felder & Steiner LLP

[57] ABSTRACT

Enabling reception quality to be improved and the capacity in terms of the number of simultaneous users in a cell to be increased, and speeding up the establishment of spreading code synchronization and the convergence of weighted coefficients, by feedback controlling weighted coefficients such that desired signal power to interference power ratio (SIR) becomes maximum. A coherent adaptive diversity configuration is employed to which absolute coherent detection is applicable. Adaptively feeding weighted coefficients back to diversity branches makes it possible to reduce the influence of the interference power from other users, and thus to increase the capacity in terms of the number of simultaneous users in the cell. Furthermore, the direction that provides the maximum received SIR is determined while rotating antennas in a state of having directivity with a predetermined angle range. Setting initial values of the weighted coefficients at values corresponding to that direction enables the weighted coefficients to converge quickly.

6 Claims, 10 Drawing Sheets

PS:PILOT SYMBOLS
IS:INFORMATION SYMBOLS

DIVERSITY RECEIVER AND ITS CONTROL METHOD

TECHNICAL FIELD

The present invention relates to a diversity receiver and its control method for carrying out diversity reception of a data signal transmitted in accordance with a direct sequence CDMA (code division multiple access) scheme.

Specifically, the present invention is applied to reception in the code division multiple access (CDMA) scheme using a spread spectrum technique, and particularly to a mobile communications field using a cellular configuration.

More specifically, the present invention is applied to the field of a diversity receiving technique which despreads received signals which are input to a plurality of antennas of a diversity receiver placed at a base station, multiplies the despread signals by appropriate weighted coefficients, and combines the resultant products. In particular, the present invention relates to the establishment of synchronization between the diversity receiver in the base station and a mobile station in the base station area, and to the procedure of setting initial values of weighted coefficients.

BACKGROUND ART

The DC-CDMA is a scheme for carrying out communications using a single frequency band shared by multiple users, and spreading codes are employed to identify the individual users. Here, orthogonal codes such as Gold codes are used as the spreading codes for the users.

In the process of despreading in the receiver, the interference signal power from other users are reduced by a factor of average processing gain (PG). In a mobile communications environment (particularly, under reverse link asynchronous environment), the received signals of the users undergo instantaneous fluctuations due to independent fading, short term fluctuations and distance fluctuations. Accordingly, to satisfy the intended reception quality of the users, it is necessary to carry out the transmission power control to keep constant the SIR at the input of the receiver in the base station, the SIR being defined as the ratio of the received signal power of each user to interference signal power from the other simultaneous users.

However, even if the transmission power control is perfect, and hence the SIR at the receiver input is kept constant without fail, the spreading codes are never completely orthogonal under the multipath environment in the mobile communications, and the interference is unavoidable due to cross-correlation having average power reduced by a factor of processing gain per user.

Thus, the interference signal power increases with the number of simultaneous users in the same frequency band. As a result, the capacity in terms of the number of simultaneous users per cell is determined by the receiving quality which in turn is determined by the required quality of the system.

To increase the capacity in terms of the number of simultaneous users, the cross-correlation due to other users must be reduced.

Interference cancellation techniques are proposed as one of the methods to reduce the cross-correlation from other users. As the interference cancellation technique are known:
1. a multi-user detector that demodulates not only the desired signal of the intended channel, but also the signals of other simultaneous users received at the receiver input using the spreading code information of the other users; and
2. a single user detector that minimizes average cross-correlation and noise components from other simultaneous users using the spreading code of only the intended channel. Among these, the single user detector of item 2 corrects a spreading replica code such that the cross-correlation from other users produced in the process of despreading the desired user signal is reduced through quadrature filters in the receiver.

Figure 1:
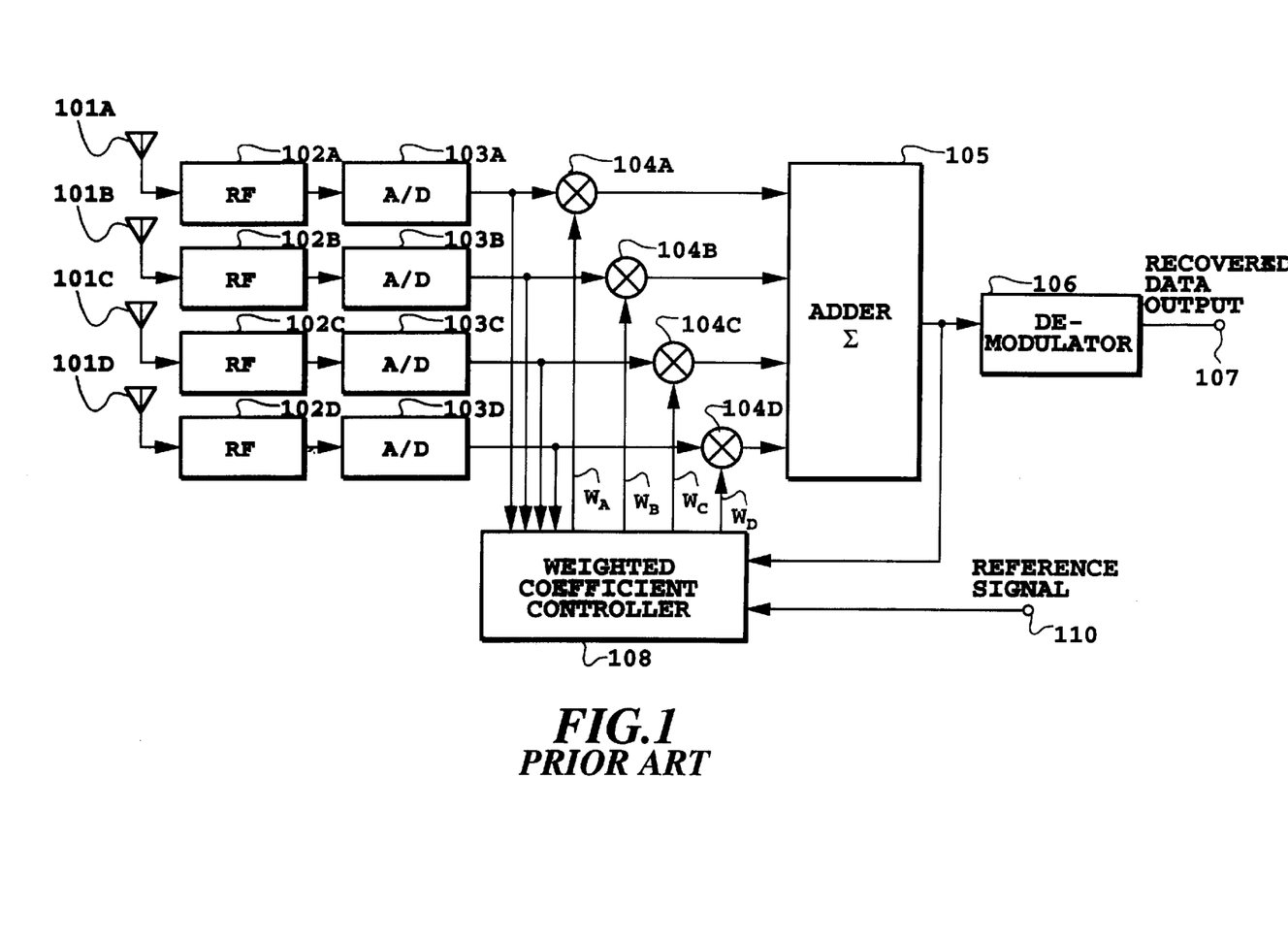
FIG. 1 is a block diagram showing a configuration of a conventional adaptive diversity technique.

As another technique to reduce the cross-correlation from other users to increase the capacity in terms of the number of simultaneous users, an adaptive diversity technique as shown in FIG. 1 is known. In FIG. 1, reference numerals 101A–101D each designate an antenna, 102A–102D each designate an RF stage, 103A–103D each designate an A/D converter, 104A–104D each designate a weighted coefficient multiplier, 105 designates an adder, 106 designates a demodulator, 107 designates a recovered data output terminal, 108 designates a weighted coefficient controller, and 110 designates a reference signal.

The conventional example as shown in FIG. 1 reduces the interference power from other users by attaching appropriate weights (WA-WD) to input signals to the antennas 101A–101D, and then combining them.

As another adaptive diversity technique in the DS-CDMA scheme, a method is known in which received signals input to antennas are despread before they are multiplied by appropriate weighted coefficients to be combined.

In this case, the weighted coefficients to be multiplied are successively updated so that the received SIR becomes maximum. This update enables the weighted coefficients to finally converge to such a value that will increase the gain in the direction of the incoming waves from a mobile station, but reduce the gain in the direction of incoming interference waves.

This is equivalent to providing the antennas with adaptive directivity by controlling the values of the weighted coefficients.

The adaptive control, however, is performed on the despread signals. Accordingly, it is necessary to establish the spreading code synchronization before starting the adaptive control at a base station.

In addition, a period of time required for the weighted coefficients to converge to the values that maximize the received SIR varies depending on values set as initial values of the weighted coefficients to be multiplied by the despread signals.

Furthermore, the conventional technique does not clearly disclose the procedures from establishing the spreading code synchronization based on the signal sent from the mobile station to setting the initial values of the weighted coefficients, which procedures are performed by the base station carrying out the adaptive diversity reception of the signals after despreading.

DISCLOSURE OF THE INVENTION

The conventional adaptive diversity technique as shown in FIG. 1 includes the multipliers 104A–104D and the adder 105 for multiplying the signals of respective branches by the weighted coefficients, and for summing up the resultant products. And the demodulator 106 demodultes the signals after the summation.

These weighted coefficients WA-WD are controlled so that the SIR of the summed signal at the adder 105 becomes maximum. However, no research reports until now have clearly disclosed a method of generating a reference signal for controlling the weighted coefficients, or a method of implementing that.

In view of this, a first object of the present invention is to provide a diversity receiver capable of improving the reception quality and increasing the capacity in terms of the number of simultaneous users in the cell by carrying out feedback control of the weighted coefficients of respective branches such that the ratio of the desired signal power to the interference power (SIR) becomes maximum.

A second object of the present invention is to provide a control method of an adaptive diversity receiver which multiplies the despread signal by the weighted coefficients, and combines the resultant products. In particular, the object is to establish the spreading code synchronization and to set appropriate initial values of the weighted coefficient control.

According to the first aspect of the present invention, a diversity receiver employing, when receiving a data signal transmitted in accordance with a direct sequence CDMA scheme, correlators for despreading, for respective branches, a plurality of fading received waves, and a plurality of multipliers for multiplying despread signals output from the correlators by weighted coefficients, the diversity receiver comprises: decision means for recovering the data signal; and weighted coefficient computing means for using decision error information obtained in response to an output signal and an input signal of the decision means as feedback information for controlling the weighted coefficients.

According to the second aspect of the present invention, a diversity receiver for performing diversity reception of a data signal transmitted in accordance with a direct sequence CDMA scheme, the diversity receiver comprises: correlators for despreading, for respective branches, a plurality of fading received waves;a plurality of multipliers for multiplying despread signals output from the correlators by weighted coefficients;an adder for summing up weighted signals output from the plurality of multipliers;phase compensation means for compensating a signal output from the adder for phase fluctuations of fading received waves;decision means for recovering the data signal from a compensated signal output from the phase compensation means-;subtraction means for computing error vector components corresponding to a difference between the data signal recovered and the compensated signal; and weighted coefficient generating means for generating the weighting coefficients in response to the phase fluctuations of the fading received signal and the error vector components.

In the diversity receiver, wherein the correlators may be each disposed after RF signal processors provided for respective branches, and carry out correlation detection using a spreading signal sequence replica at a symbol information rate.

According to the third aspect of the present invention , a diversity receiver comprising, for L multipaths, L sets of the correlators, the multipliers, the adder, the phase compensation means and the weighted coefficient generating means, and further comprises: RAKE combining means for combining phase compensated signals output from the phase compensation means corresponding to respective paths;decision means for recovering an incoming data signal by deciding an output of the RAKE combining means;error vector computing means for computing error vector components from an input signal and an output signal of the decision means, or from input signals to the RAKE combining means associated with respective paths and the output signal from the decision means; and feedback signal computing means for supplying the weighed coefficient generating means for respective paths with feedback decision information for computing the weighted coefficients from the error vector components and received phase components of individual paths.

Here, the diversity receiver, may further comprises M sets of antennas and RF stages, wherein the diversity receiver in claim 4 is disposed in common after the RF stages.

According to the fourth aspect of the present invention, a diversity receiver for performing mobile communications with a mobile station using a direct sequence CDMA scheme that carries out multiple access transmission by spreading a narrowband signal to a wideband signal using a spreading code with a rate higher than that of an information rate, the diversity receiver comprises: a plurality of receiving antennas for receiving a direct sequence spread signal sent from the mobile station, the receiving antennas being set in a directional state;spreading code synchronization establishing means for performing spreading code synchronization establishment which corresponds to despreading of an input signal to each of the plurality of receiving antennas-;weighted coefficient multiplication means for multiplying weighted coefficients by signals obtained through despreading by the spreading code synchronization establishing means;signal combining means for combining signals after multiplications by the weighted coefficient multiplication means; and adaptive diversity reception control means for controlling the weighted coefficients such that a received SIR becomes maximum.

Here, the diversity receiver, may further comprises: means for generating forward link transmission weighted coefficients from the weighted coefficients which are obtained by the adaptive diversity reception control means and maximize the received SIR, the forward link transmission weighted coefficients being used when carrying out transmission from the diversity receiver to the mobile station; and means for correcting the forward link transmission weighted coefficients using a reverse link control signal transmitted from the mobile station to the diversity receiver.

According to the fifth aspect of the present invention , a diversity receiver control method for performing mobile communications between a mobile station and a diversity receiver using a direct sequence CDMA scheme that carries out multiple access transmission by spreading a narrowband signal to a wideband signal using a spreading code with a rate higher than that of an information rate, the diversity receiver control method comprises the steps of: receiving with a plurality of receiving antennas a direct sequence spread signal sent from the mobile station, the receiving antennas being set in a directional state;establishing spreading code synchronization which corresponds to despreading of an input signal to each of the plurality of receiving antennas;multiplying weighted coefficients by signals obtained through despreading in the step of establishing spreading code synchronization;combining signals after multiplications in the step of multiplying weighted coefficients; and controlling adaptive diversity reception by controlling the weighted coefficients such that a received SIR becomes maximum.

In the diversity receiver control method, wherein the step of receiving with a plurality of receiving antennas may comprise a step of receiving the direct sequence spread signal sent from the mobile station with the antennas being set in non-directional state; and the step of controlling adaptive diversity reception comprises a step of setting initial values of the weighted coefficients at values corresponding to the non-directional state.

In the diversity receiver control method, wherein the step of receiving with a plurality of receiving antennas may comprise a step of receiving the direct sequence spread signal sent from the mobile station with the antennas being set in non-directional state; and the step of controlling adaptive diversity reception comprises a step of setting initial values of the weighted coefficients at values obtained when the diversity receiver turns its gain to one direction.

In the diversity receiver control method, wherein the step of receiving with a plurality of receiving antennas may comprise a step of receiving the direct sequence spread signal sent from the mobile station with the antennas being set in a state in which the diversity receiver has directivity in one direction with a predetermined angle range, and sets the directivity which provides maximum received SIR by measuring the received SIR one or more times while rotating the directivity of the antennas at predetermined intervals after the establishment of the spreading code synchronization; and the step of controlling adaptive diversity reception comprises a step of setting initial values of the weighted coefficients at values obtained when the diversity receiver turns its gain to the direction providing the maximum received SIR.

Here, the diversity receiver control method, may further comprise the steps of: generating forward link transmission weighted coefficients from the weighted coefficients which are obtained in the step of controlling adaptive diversity reception, and maximize the received SIR, the forward link transmission weighted coefficients being used when carrying out transmission from the diversity receiver to the mobile station; and correcting the forward link transmission weighted coefficients using a reverse link control signal transmitted from the mobile station to the diversity receiver.

BEST MODE FOR CARRYING OUT THE INVENTION

In the following example which will be described with reference to the accompanying drawings as an embodiment to which the present invention is applied, we assume that it has a coherent adaptive diversity configuration to which absolute coherent detection can be applied. In this configuration, phase fluctuation compensation against fading is carried out by estimating phase fluctuations using known pilot symbols. Then, weighted coefficients are controlled such that an error vector becomes minimum (that is, a received SIR becomes maximum), where the error vector is defined as a difference between the signal whose phase fluctuations due to fading are compensated and a signal obtained by decision.

Thus, in a diversity receiver in accordance with the present invention, the maximum SIR can be obtained for each symbol by minimizing the error vector obtained by decision feedback. In other words, the effect of interference power from other simultaneous users can be reduced by the adaptive feedback control of the weighted coefficients of respective diversity branches. As a result, the capacity in terms of the number of simultaneous users in a cell can be increased.

More specifically, the embodiments in accordance with the present invention employ a CDMA (Code Division Multiple Access) scheme that carries out multiple access transmission by spreading information into a wideband signal using spreading codes with a rate higher than an information rate. A transmitting end forms a frame by periodically inserting a known pilot signal into an information data signal at several symbol intervals, and expands bandwidth using a spreading code with a period equal to an information symbol period.

On the other hand, a receiver which receives N-multipath signals comprises M antennas and RF receiving circuits, where M is equal to or greater than two; correlators each for obtaining correlation using a spreading code sequence replica in synchronism with a spreading code sequence in a desired received signal associated with each antenna; M weighted coefficient multipliers for multiplying the output of each correlator by a complex weighted coefficients; an adder for summing up outputs of the weighted coefficient multipliers; a phase error estimation compensator for estimating received phase error of each information signal by interpolation of the received phase of the pilot signal of a known pattern which is included in the frame in the output sequence from the adder, thus to compensate the received phase error; a decision portion for making decision of the signal which has undergone the phase error compensation signal by symbol by the phase error estimation compensator; an error vector generator for generating the error vector between a received signal vector after the phase error compensation and a signal vector after the decision; a phase fluctuation estimation multiplier for multiplying the error vector generated by the error vector generator by the phase fluctuation estimate estimated by the phase error estimation compensator; and a complex weighted coefficient controller for obtaining complex weighted coefficients of the individual antennas such that the mean square error of the multiplier becomes minimum.

The adaptive diversity block of the receiver described above comprises L correlators for the multipaths to be RAKE combined, where L is the number of multipaths; L weighted coefficient multipliers; L adders and L phase error estimation compensators. It further comprises a RAKE combiner for summing up the signals output from the L phase error estimation compensators after multiplying them by estimated complex envelopes used as weighted coefficients; a decision portion for making a decision of the output signal from the RAKE combiner; an error vector generator for generating an error vector, that is, the difference between a received signal vector after the phase error compensation and a signal vector after the decision; a phase fluctuation estimation multiplier for multiplying the error vector generated by the error vector generator by the phase fluctuation estimates estimated by the phase error estimation compensators; and complex weighted coefficient controllers for obtaining the complex weighted coefficients of the individual branches such that the mean square error of the multiplier becomes minimum.

According to the embodiments to which the present invention is applied: 1. the weighted coefficients are decided for respective branches by the feedback control that minimizes the error vector; and 2. the weighting processing is carried out on the information symbols that have been despread. In other words, it performs a baseband processing, so to speak. Thus, the hardware configuration is much more simplified than that of the conventional system which carries out weighting at the stage previous to the despreading stage which requires the processing at a chip rate.

The embodiments in accordance with the present invention will now be described in more detail referring the accompanying drawings.

Embodiment 1

Figure 2:
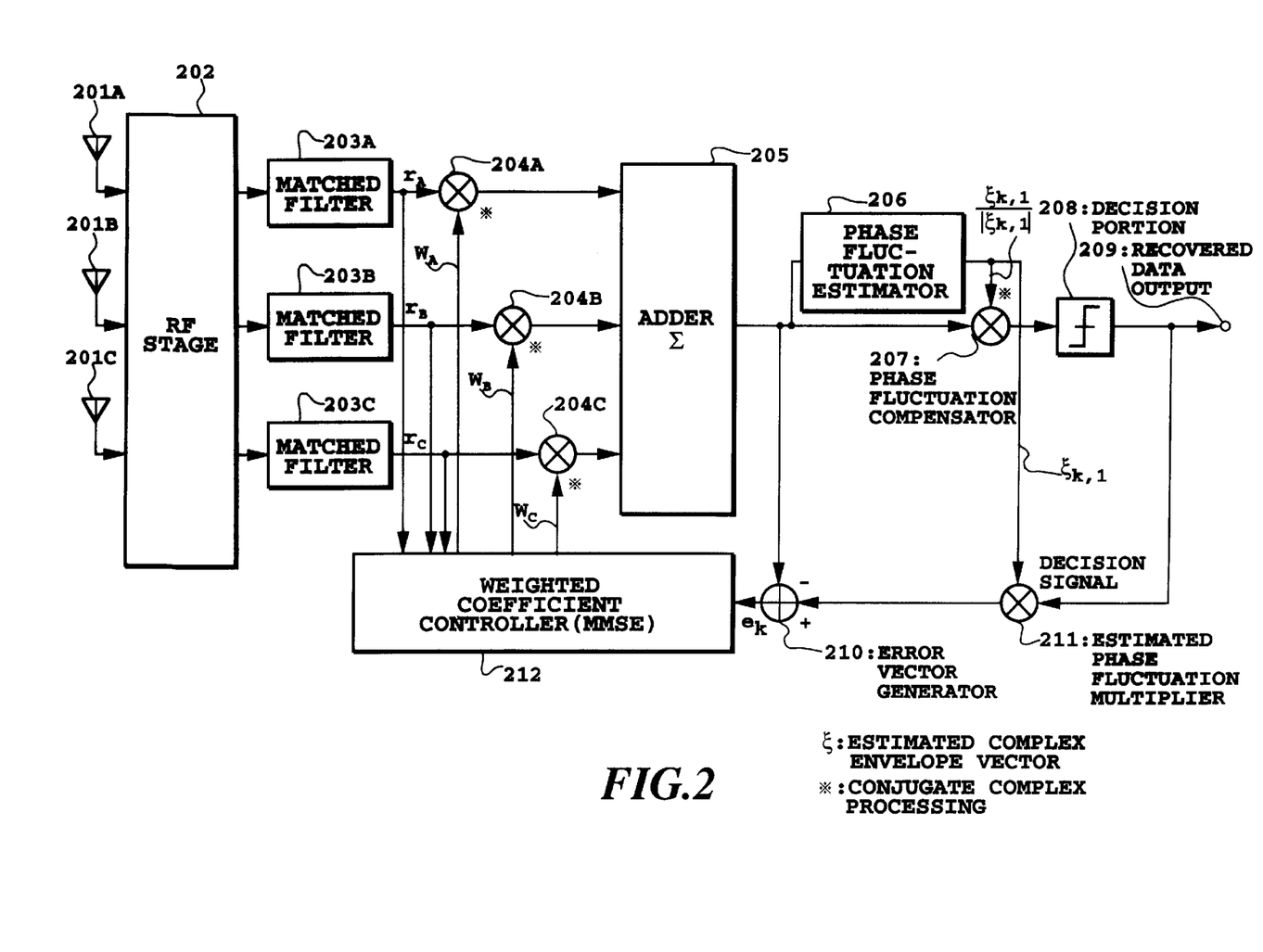
FIG. 2 is a block diagram showing a first; embodiment of an adaptive diversity system in accordance with the present invention.

FIG. 2 shows an embodiment of a diversity receiver to which the present invention is applied. In FIG. 2, the reference numerals 201A–201C each designate an antenna, 202 designates an RF stage, 203A–203C each designate a matched filter, 204A–204C each designate a weighted coefficient multiplier, 205 designates an adder, 206 designates a phase fluctuation estimator, 207 designates a phase fluctuation compensator, 208 designates a decision portion, 209 designates a recovered data output terminal, 210 designates a error vector generator, ek designates an error vector, 211 designates an estimated phase fluctuation multiplier, and 212 designates a weighted coefficient controller. In addition, the * mark in this figure indicates a conjugate complex processing. In this specification, we will represent the vector signals by normal types rather than by bold types for the convenience of typing.

The diversity receiver as shown in FIG. 2 will now be described assuming that it is used as a receiver of a base station. Besides, it is assumed that the antenna of the base station is much taller than antennas of mobile stations. In this case, the incoming signals to the base station from the mobile stations in the cell arrive from various directions to be received by the base station. The received signals from other users become interference signals to a desired received signal on the intended channel. In the DS-CDMA system, the correlations between the spreading codes of the users in the despreading process are small, and the signal power of the other users after the despread is reduced on average by a factor of the processing gain. The residual interference power, however, will degrade the received quality because it increases with an increase in the number of the simultaneous users.

The incoming waves from the mobile stations in the cell to the antenna of the base station arrive from random directions. Accordingly, the signal to interference power ratio (SIR) of the desired received signal can be increased by maximizing the combined gain of the multiple antennas for the desired channel, and by setting the received directions of the interference stations at the null point for the interference signal. The received signals from M antennas (only three antennas 201A–201C are depicted in FIG. 2) have delays determined by spaces between antennas, incident angles, and the frequency of a carrier. When the spaces between antennas are small, the amplitude fluctuations and phase fluctuations due to fading transmission paths can be handled as the same for respective antennas.

The incoming RF signals obtained through the antennas 201A–201C, are each amplified and frequency converted by the RF stage 202, thus being converted into baseband signals. Subsequently, the baseband signals are each despread by the matched filters 203A–203C using the spreading code replica of the intended channel(specified channel). The despread signals are output as rA, rB and rC, and are multiplied by the complex weighted coefficients associated with the branches by the multipliers 204A–204C. The complex weighted coefficients undergo conjugate complex processing (represented by the * mark) before multiplied by the multipliers 204A–204C. The M (M=3, in this case) signals multiplied by the weighted coefficients are summed up by the adder 205.

Figure 3:
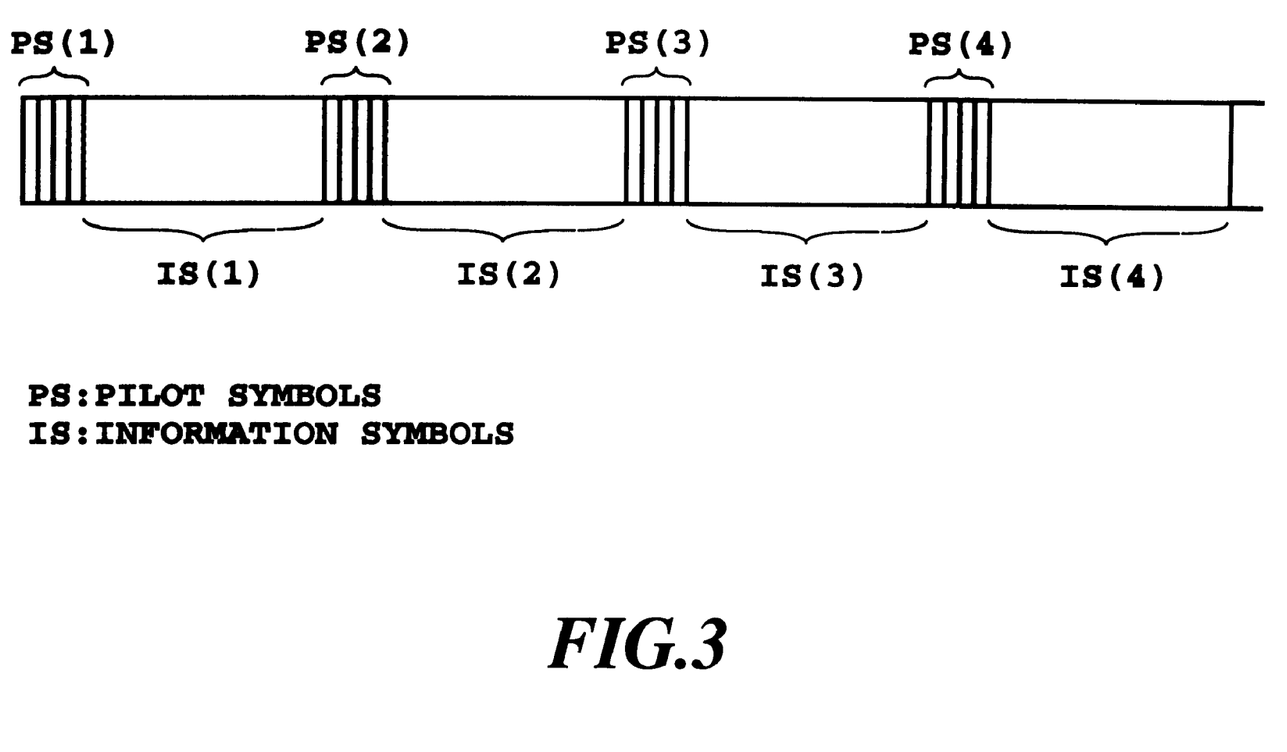
FIG. 3 is a diagram illustrating a structure of a frame applicable to the adaptive diversity system in accordance with the present invention.

The summed up signal is fed to the phase fluctuation estimator 206 that estimates its received phase used for the "absolute coherent detection". Specifically, it estimates the received phase of the fading received waves using the pilot symbols PS of a known pattern which are periodically inserted into the transmitted frame (whose structural example is illustrated in FIG. 3), and further estimates the received phase fluctuations of the individual information symbols IS due to fading by interpolating the received phase of the pilot symbols PS at both sides of the information symbols, thereby compensating for the received phase fluctuations by the phase fluctuation compensator 207 (in FIG. 2).

Figure 4:
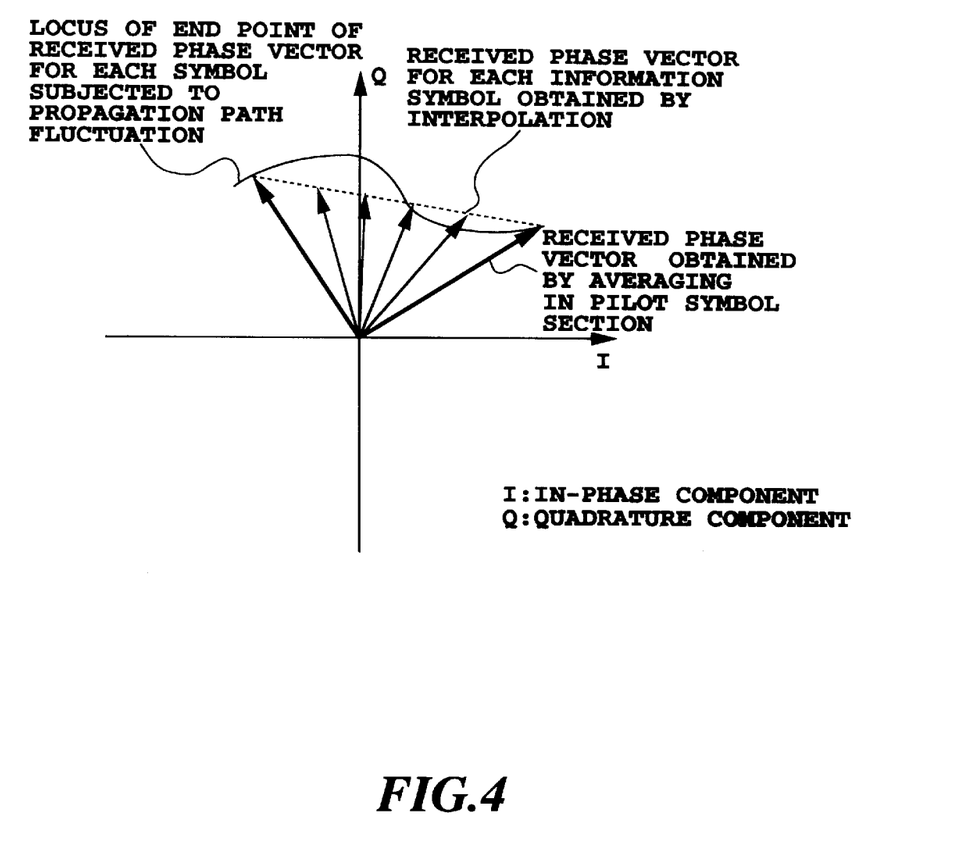
FIG. 4 is a diagram illustrating a phase error compensation method in the embodiments in accordance with the present invention.

FIG. 4 illustrates an example of the compensation method of the phase error of the information data using the pilot symbols. In FIG. 4, the abscissas I represent the in-phase component, and the ordinates Q represent the quadrature components.

The signal with its phase fluctuating due to fading is decided by the decision portion 208 to recover the transmitted data. For example, with regard to the binary PSK (BPSK), the decision is made whether +1 or −1. Generally speaking, when the SIR is small owing to large interference power, the phase error increases between the phase fluctuation compensated signal vector and the decided signal vector. Considering this, the error vector ek representing the phase error is output from the error vector generator (subtractor) 210. Then, the weighted coefficients are controlled in the procedure which will be described in detail below such that the error vector ek becomes minimum.

The error vector ek is generated by multiplying the decided signal by an estimated phase fluctuation amount output from the phase fluctuation estimator 206 by the estimated phase fluctuation multiplier 211, and by obtaining the difference between the product and the signal before the phase fluctuation compensation. The weighted coefficient controller 212 controls the weighted coefficients using the error vector ek, and updates the weighted coefficients for individual symbols using the multiplication output signal. As the update algorithm, LMS (Least Mean Square) algorithm, or RLS (Recursive Least Square) algorithm can be used. The weighted coefficient update using the LMS algorithm can be performed as follows:

$$wk(m+1) = wk(m) + \mu \cdot r(m) \cdot ek^*(m) \tag{1}$$

where, wk(m) is a weighted coefficient vector of a user k in the time series m, r(m) is a despread signal vector (outputs of the matched filters), ek(m) is the error vector of the user k, and μ is a fixed value for determining the averaging time.

The diversity receiver to which the present invention is applied can use any types of spreading codes regardless of their types because it performs weighted coefficient control on the symbols after the despreading.

Embodiment 2

Figure 5:
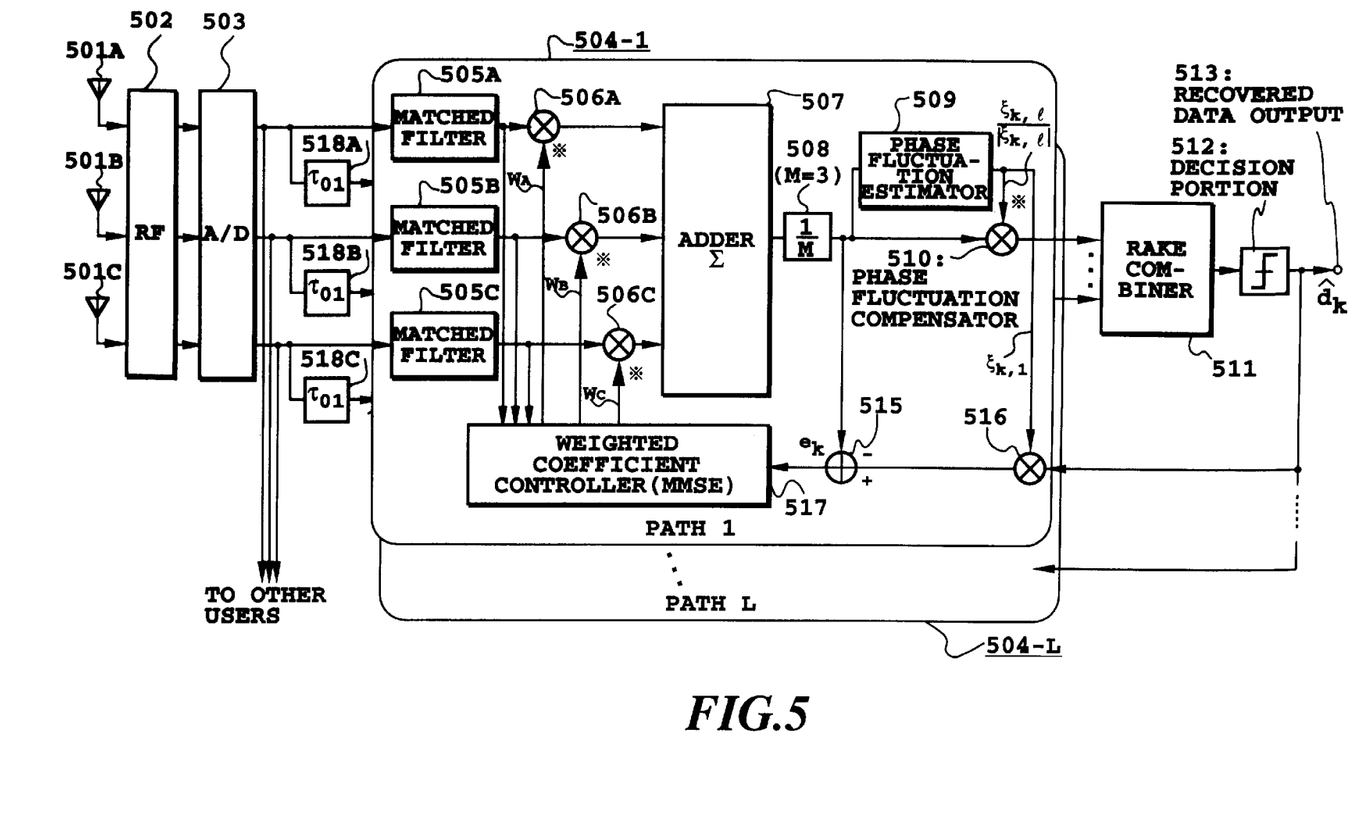
FIG. 5 is a block diagram showing a second embodiment in accordance with the present invention.

FIG. 5 is block diagram showing a configuration of an embodiment having a RAKE function for multipath signals. The configuration in FIG. 5 comprises antennas 501A–501C; an RF stage 502; an A/D converter 503; delay circuits 518A/518C; baseband processors 504-1–504-L for first to L-th path signals, each of which includes matched filters 505A–505C, weighted coefficient multipliers 506A–506C, an adder 507, a level adjuster 508, a phase fluctuation estimator 509, a phase fluctuation compensator 510, a RAKE combiner 511, a decision portion 512, a recovered data output 513, an error vector generator 515, an estimated phase fluctuation multiplier 516, and a weighted coefficient controller 517.

If the height of the received antenna is affected by surrounding buildings, the radio waves from mobile stations are received through multipaths. To handle the multipath signals, this embodiment has the matched filters 505A–505C, weighted coefficient multipliers 506A–506C, the adder 507, the phase fluctuation estimator 509, the phase fluctuation compensator 510, the error vector generator 515, the estimated phase fluctuation multiplier 516, and the weighted coefficient controller 517, all of which are needed by the number of the multipaths for each user. Here, the following processes are similar to those of the embodiment as shown in FIG. 2 (the single path case): despreading by the matched filters; multiplying the signals of respective branches by the complex weighted coefficients, followed by summing up the products; carrying out the phase fluctuation estimation using the pilot symbols in the frame (see, FIG. 3); and performing the phase fluctuation compensation in accordance with the positions of the information symbols. Only, it is necessary for the multipath signals to be despread at the received spreading code phases corresponding to the transmission delay times of respective paths to achieve the RAKE combining.

The phase fluctuation compensated signals of respective paths undergo maximal-ratio combining by the RAKE combiner 511 such that power weighting is implemented using the complex envelopes of the paths. The RAKE combined signal of each user is fed to the decision portion 512 which decides the signal to recover the transmitted data.

The error vector ek output from the error vector generators 515 and fed to the weighted coefficient controllers 517 can be obtained by multiplying the decided data output from the decision portion 512 by the estimated phase fluctuations output from the phase fluctuation estimators 509 through the estimated phase fluctuation multipliers 516, and by obtaining differences between the products and the signals before the phase fluctuation compensation.

Embodiment 3

Figure 6:
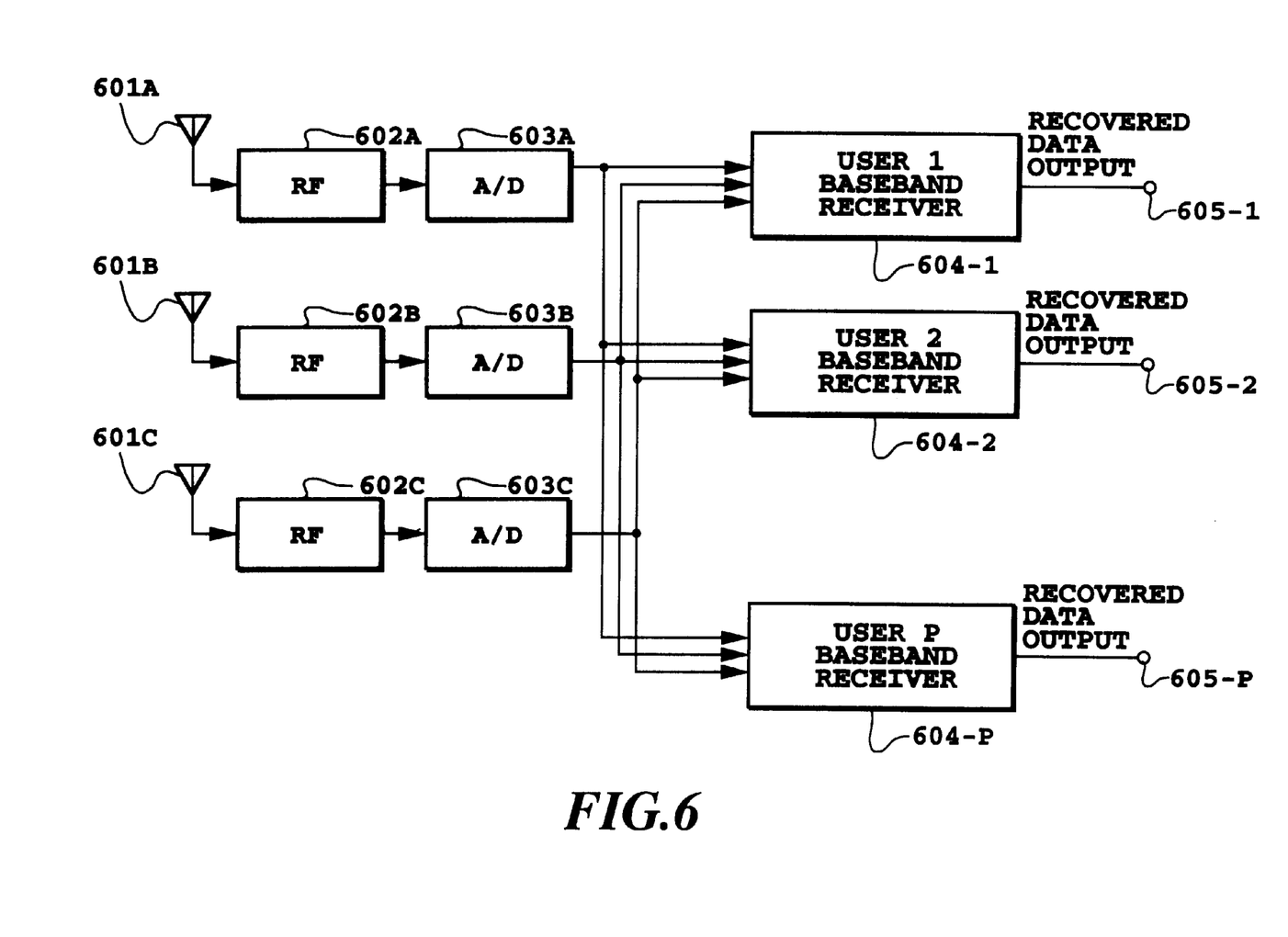
FIG. 6 is a block diagram showing a third embodiment in accordance with the present invention.

FIG. 6 is a block diagram showing the entire configuration of a receiver when a diversity receiver, to which the present invention is applied, is used as a base station receiver. Since the present embodiment employs the baseband digital signal processing to perform the weighting control of respective branches, RF stages (including IF circuits) 602A–602C and A/D converters 603A–603C of respective branches can be used in common as shown in FIG. 6. Thus, the A/D converter outputs of the branches are input to baseband receiving portions 604-1–604-P for carrying out the weighting control, combining and demodulation for each user. The baseband receiving portions 604-1–604-P each correspond to the embodiment 2 as shown in FIG. 5.

With this arrangement, it is possible to reduce the size and cost of the device because the diversity reception can be implemented by the baseband digital signal processing.

Next, a procedure will be described for starting adaptive control of the weighted coefficients in a base station in the case where a mobile station is present in the area of the base station, and the base station establishes the spreading code synchronization to a direct sequence signal transmitted from the mobile station.

Embodiment 4

FIG. 2 is a block diagram showing the configuration of a diversity receiver in a base station in the present embodiment. The diversity receiver in the base station has a plurality of receiving antennas, establishes spreading code synchronization by matched filters prepared for respective antennas, and despreads the signal from the mobile station. The diversity reception can be achieved by multiplying the despread signals associated with antennas by appropriate weighted coefficients, and by combining the products by an adder.

This embodiment employs a coherent adaptive diversity configuration to which the absolute coherent detection can be applied. More specifically, this embodiment comprises a phase fluctuation estimator for estimating the phase fluctuation due to fading, and a phase fluctuation compensator for carrying out compensation. The phase fluctuation estimator estimates the received phase errors of information signals by interpolating the received phases of known pilot symbols. The weighted coefficients of individual branches are determined by the weighted coefficient controller. The MMSE decision feedback control is achieved by multiplying the decided signal output from the decision portion 208 by the estimated phase fluctuations output from the phase fluctuation estimator 206 by the estimated phase fluctuation multiplier 211, and by minimizing the error vector which is the difference between the product signals and the signals before the phase fluctuation compensation. Finally, the SIR of the received signal converges to a value which maximizes the SIR.

Figure 7:
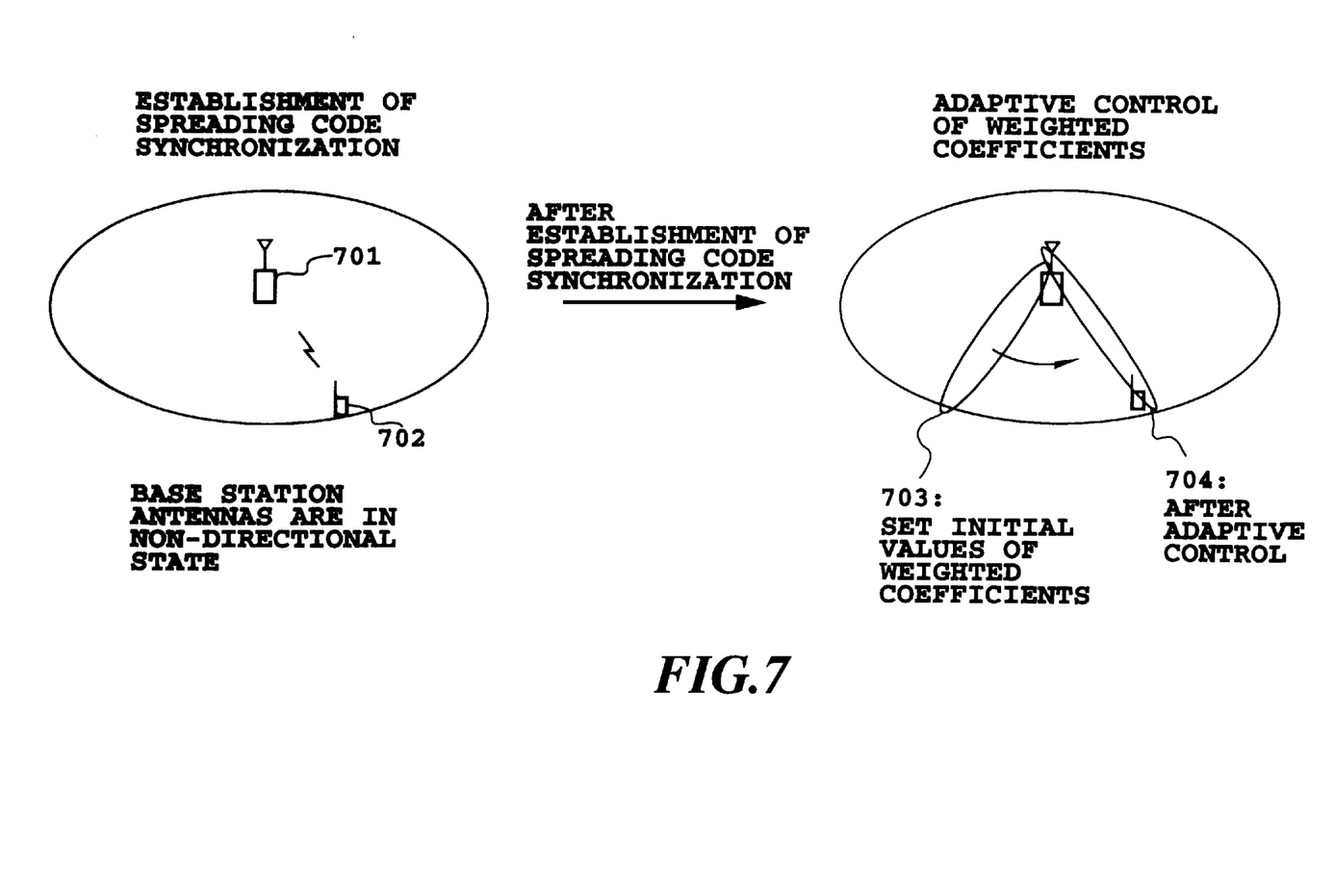
FIG. 7 is a diagram illustrating procedures for establishing spreading code synchronization, and adaptive control of weighted coefficients in a fourth embodiment in accordance with the present invention.
Figure 8:
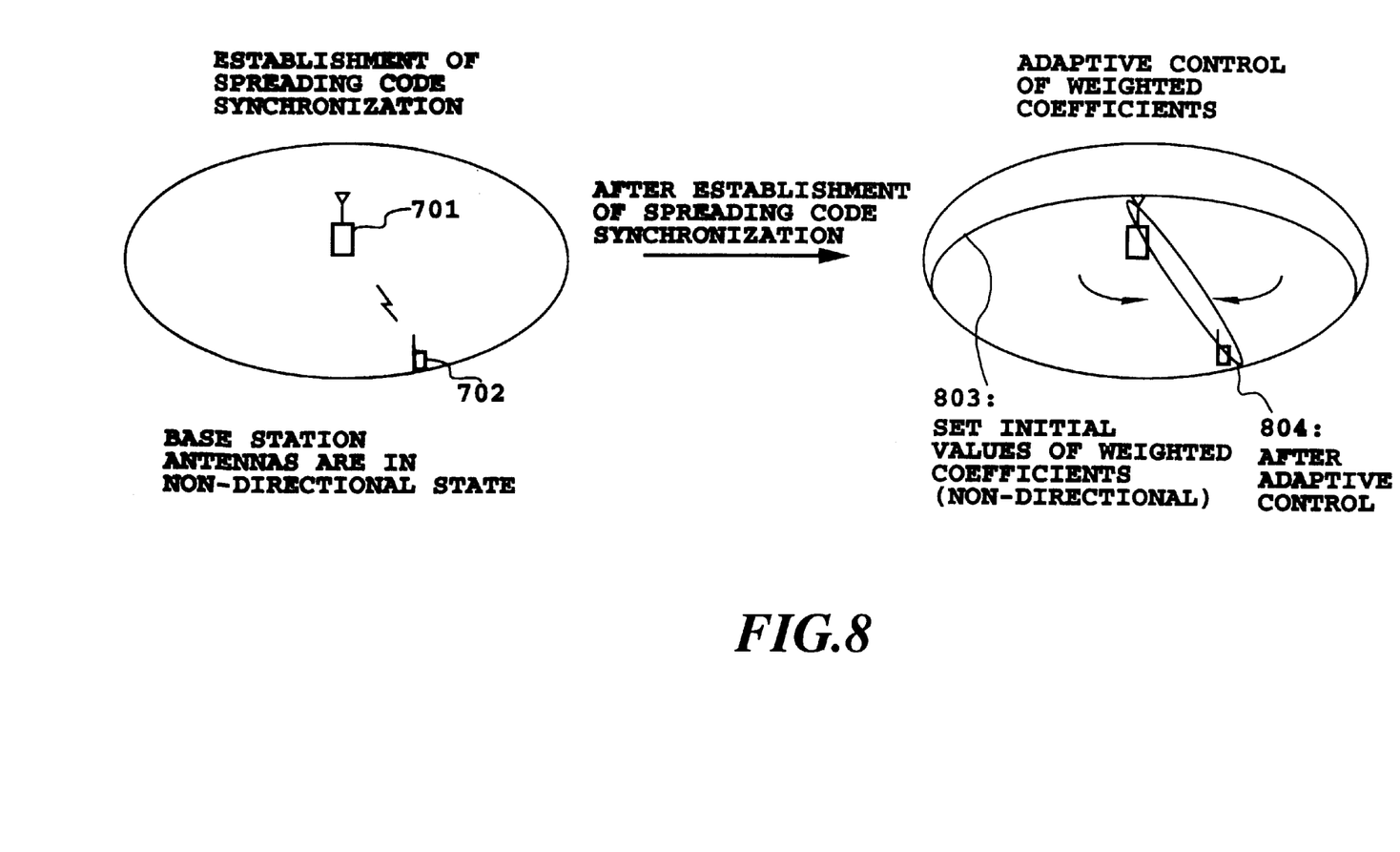
FIG. 8 is a diagram illustrating procedures for establishing the spreading code synchronization, and the adaptive control of weighted coefficients in the fourth embodiment in accordance with the present invention.

FIGS. 7 and 8 illustrate the procedures for carrying out the adaptive diversity reception, in which a base station 701 of this embodiment establishes the spreading code synchronization based on the signal sent from a mobile station 702, and sets the initial values of the weighted coefficients.

As shown in FIG. 7, the signal sent out of the mobile station 702 arrives at the base station 701 from all directions of 360-degrees. Thus, the base station 701 has its antenna set at non-directional state to receive the signal to establish the synchronization of the spreading code, thereby establishing the spreading code synchronization. Subsequently, the adaptive control of the weighted coefficients are carried out for the despread signal.

The direction of the incoming wave, however, cannot be detected at the time when the synchronization of the spreading code is established. Thus, the initial values of the weighted coefficients are first set at values associated with a particular direction with regard to the diversity receiver (703). Then, the values of the weighted coefficients converge to such values that will maximize the received SIR (704).

Alternatively, as shown in FIG. 8, the initial values of the weighted coefficients are first set at the non-directional state (803). Then, the values of the weighted coefficients converge to such values that will maximize the received SIR (804).

Embodiment 5

Figure 9:
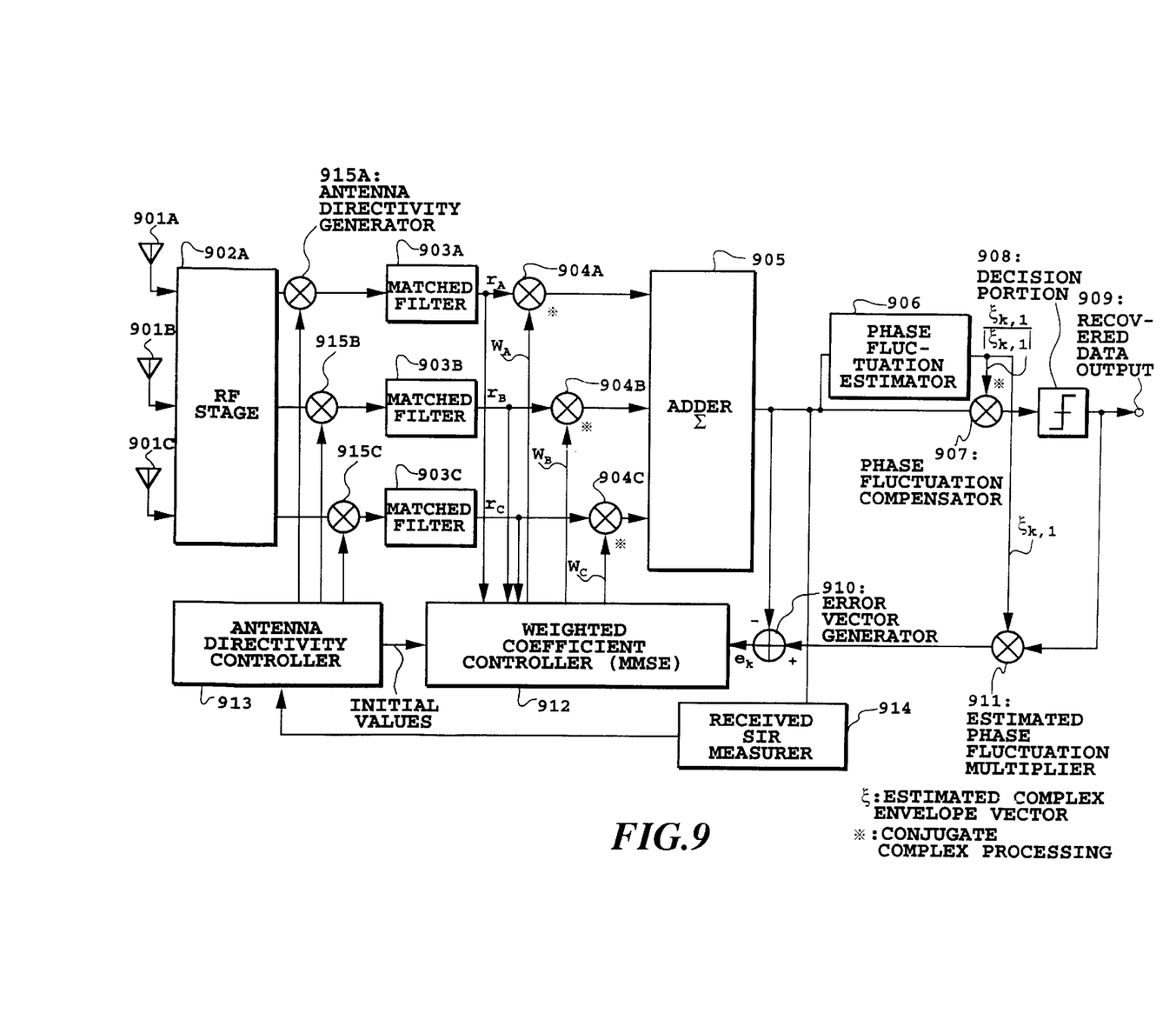
FIG. 9 is a block diagram showing a fifth embodiment of an adaptive diversity system in accordance with the present invention.

FIG. 9 shows a configuration of a diversity receiver in a base station in the present embodiment.

The configuration of the diversity receiver in the base station comprises, in addition to that as described in the embodiment 4 in connection with FIG. 2, an arrangement which has the received signal before the phase fluctuation compensation sent to a received SIR measurer 914, and which enables an antenna directivity controller 913 to control the directivity of the antenna in response to the measured SIR through antenna directivity generators 915A, 915B and 915C.

Figure 10:
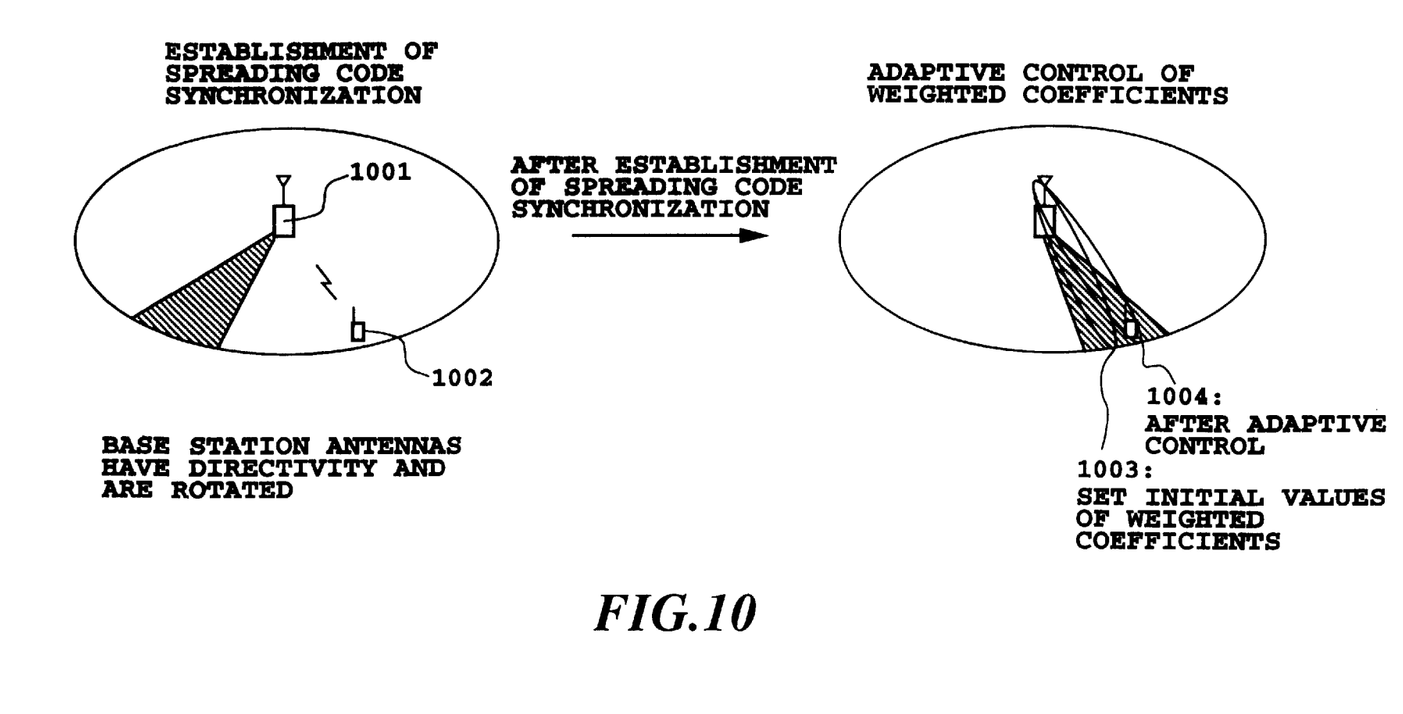
FIG. 10 is a diagram illustrating procedures for establishing the spreading code synchronization, and the adaptive control of weighted coefficients in the fifth embodiment in accordance with the present invention.

FIG. 10 illustrates the procedures for carrying out the adaptive diversity reception, in which a base station 1001 of this embodiment establishes the spreading code synchronization with the signal sent from a mobile station 1002, and sets the initial values of the weighted coefficients.

The base station 1001 has the antenna set at the directional state with a certain angle, and rotates its direction at a predetermined interval to receive the signal from the mobile station 1002, thereby establishing the spreading code synchronization. The spreading code synchronization is carried out in each direction of the antenna, and the signal level (SIR) is detected in that direction, thereby directing the antenna in the direction which achieves the maximum received SIR.

Subsequently, the adaptive control of the weighted coefficients of the despread signal is started. In this case, since it is known that the incoming wave arrives from the direction close to that of the antenna, the initial values of the weighted coefficients can be set at values corresponding to the direction of the antenna to start the adaptive control (1003). The weighted coefficients converge to such values that will maximize the SIR (1004).

As described above, the present invention minimizes the error vector by decision feedback so that the weighted coefficients of the individual diversity branches are controlled to maximize the SIR for each symbol. As a result, the effect of the interference power from other simultaneous users can be reduced. This makes it possible to increase the capacity in terms of the number of simultaneous users in the cell.

Furthermore, according to the present invention, the synchronization of the spreading code and the adaptive control of the weighted coefficients, which are necessary for implementing the adaptive diversity reception of the signals from the mobile stations, can be started independently of the direction of the incoming wave. This enables the synchronization of the spreading code to be established faster.

Moreover, since the SIR increases when the antenna points to the direction of the incoming wave, the spreading code synchronization can be established even under the environment of abundant interference noise. The weighted coefficient control following establishment of the spreading code synchronization can set its initial value close to those corresponding to the incoming direction of the wave because it is nearly known. Thus, the convergent time of the weighted coefficients can be shortened.

What is claimed is:

1. A diversity receiver for performing diversity reception of a data signal transmitted in accordance with a direct sequence CDMA scheme, said diversity receiver comprising:

a plurality of correlators for despreading, for respective branches, a plurality of fading received waves;

a plurality of multipliers for multiplying despread signals output from respective ones of said correlators by weighted coefficients;

an adder for summing up weighted signals output from said plurality of multipliers;

a phase fluctuation estimation means for estimating phase fluctuations of fading received waves with respect to a signal output from said adder;

phase fluctuation compensating means for compensating said signal output from said adder for phase fluctuations of fading received waves by using said estimated phase fluctuations;

deciding and recovering means for recovering said transmitted data signal from a phase compensated signal output from said phase fluctuation compensating means;

estimated phase fluctuation multiplying means for multiplying said recovered data signal by an output signal of said phase fluctuation estimating means;

subtraction means for generating error vector components by subtracting said output of said adder from said output of said estimated phase fluctuation multiplying means; and weighted coefficient controlling means for generating said weighted coefficients in response to said outputs from said correlators and said error vector components.

2. The diversity receiver as claimed in claim 1, wherein said correlators are each disposed after RF signal processors provided for respective branches, and carry out correlation detection using a spreading signal sequence replica at a symbol information rate.

3. A diversity receiver for performing diversity reception of a data signal transmitted in accordance with a direct sequence CDMA scheme, said diversity receiver comprising:

for individual paths of L multipaths, a plurality of correlators for despreading, for respective branches, a plurality of fading received waves;

a plurality of multipliers for multiplying despread signals output from respective ones of said correlators by weighted coefficients;

an adder for summing up weighted signals output from said plurality of multipliers;

a phase fluctuation estimating means for estimating phase fluctuations of fading received waves with respect to a signal output from said adder;

phase fluctuation compensating means for compensating said signal output from said adder for phase fluctuations of fading received waves by using said estimated phase fluctuations;

deciding and recovering means for recovering said transmitted data signal from a phase compensated signal output from said phase fluctuation compensating means; and said diversity receiver further comprising:

RAKE combining means for combining phase compensated signals output from said phase fluctuation compensating means corresponding to respective paths;

decision means for recovering the transmitted data signal by deciding an output of said RAKE combining means; and means for inputting said recovered data signal into estimated phase fluctuation multiplying means which corresponds to each path and which multiplies said recovered data signal by an output signal of said phase fluctuation estimating means.

4. The diversity receiver as claimed in claim 3, further comprising M sets of antennas and RF stages, wherein said diversity receiver in claim 3 is disposed in common after said RF stages.

5. A diversity receiver as claimed in claim 1, further comprising:

a plurality of antenna directivity generating units for adding for respective branches antenna directivity to a plurality of inputted fading received waves;

a received SIR measuring unit for measuring an SIR of an output signal of said adder; and antenna directivity controlling means for controlling said antenna directivity generating units such that a received SIR becomes maximum in response to measured results of said received SIR measuring unit;

wherein outputs of said plurality of antenna directivity generating units are input into said plurality of correlators, respectively.

6. The diversity receiver as claimed in claim 5, further comprising:

means for generating forward link transmission weighted coefficients from said weighted coefficients which are obtained by said adaptive diversity reception control means and maximize the received SIR, said forward link transmission weighted coefficients being used when carrying out transmission from said diversity receiver to said mobile station; and means for correcting said forward link transmission weighted coefficients using a reverse link control signal transmitted from said mobile station to said diversity receiver.

* * * * *